United States Patent
Hetherington et al.

(12) 
(10) Patent No.: US 6,407,754 B1
(45) Date of Patent: Jun. 18, 2002

(54) METHOD, SYSTEM AND COMPUTER PROGRAM PRODUCT FOR CONTROLLING THE GRAPHICAL DISPLAY OF MULTI-FIELD TEXT STRING OBJECTS

(75) Inventors: David James Hetherington, Austin, TX (US); David Bruce Kumhyr, Fuquay-Varina; Stanford Louis Yates, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,802

(22) Filed: Dec. 15, 1998

(51) Int. Cl.$^7$ ................................................ G09G 5/00
(52) U.S. Cl. ....................... 345/765; 345/780; 345/744; 707/4; 707/536
(58) Field of Search ................................ 345/780, 744, 345/355, 334, 335, 765, 848, 740, 746, 748, 778; 707/4, 536, 101, 540, 2, 10; 704/8

(56) References Cited

U.S. PATENT DOCUMENTS

| | | | |
|---|---|---|---|
| 5,546,575 A | * 8/1996 | Potter et al. | 707/101 |
| 5,678,039 A | * 10/1997 | Hinks et al. | 707/4 |
| 5,734,887 A | * 3/1998 | Kingberg et al. | 707/4 |
| 5,778,356 A | * 7/1998 | Heiny | 707/2 |
| 5,812,964 A | 9/1998 | Finger | 704/7 |
| 5,872,973 A | * 2/1999 | Mitchell et al. | 709/332 |
| 5,974,372 A | * 10/1999 | Barnes et al. | 704/8 |
| 6,144,377 A | * 11/2000 | Oppermann et al. | 345/355 |

OTHER PUBLICATIONS

Microsoft System Journal. "Supporting multilanguage text layout and complex scripts with Windows NT 5.0." 11/1998.*

* cited by examiner

Primary Examiner—Raymond J. Bayerl
Assistant Examiner—Tadesse Hailu
(74) Attorney, Agent, or Firm—Marilyn Smith Dawkins; Bracewell & Patterson, L.L.P.

(57) ABSTRACT

An interface to a multi-field text string object is provided to intercept display requests from a control utilizing a single field text string to the multi-field text string object. The interface passes contents of a current display field within the multi-field text string object to the legacy control in response to intercepted requests. The interface also intercepts change requests, such as Java setText( ) methods, from the legacy control to edit the contents of the multi-field text string object. The intercepted change requests are redirected by the interface to a specialized change control, which implements methods for changing the contents of any field within the multi-field text string object. The specialized change control performs the change requested by the legacy display control on a current display field of the multi-field text string objects. The interface thus precludes the necessity of implementing specialized display control merely for displaying the contents of the multi-field text string object, permitting legacy controls to display the contents of a current display field. The interface may also be coupled to a grouping class allowing multiple controls—either specialized or legacy controls—to be influenced as one monolithic unit.

18 Claims, 3 Drawing Sheets

西

林

菅野

METHOD, SYSTEM AND COMPUTER PROGRAM PRODUCT FOR CONTROLLING THE GRAPHICAL DISPLAY OF MULTI-FIELD TEXT STRING OBJECTS

RELATED APPLICATIONS

The present invention is related to the subject matter of the following commonly assigned, copending U.S. patent applications: Ser. No. 09/211,810 entitled "METHOD, SYSTEM, AND COMPUTER PROGRAM PRODUCT FOR PROVIDING A USER INTERFACE WITH ALTERNATIVE DISPLAY LANGUAGE CHOICES" and filed Oct. 15, 1998; Ser. No. 09/211,809 entitled "METHOD, SYSTEM AND COMPUTER PROGRAM PRODUCT FOR CAPTURING LANGUAGE TRANSLATION AND SORTING INFORMATION INTO A TEXT STRING CLASS" and filed Dec. 15, 1998; Ser. No. 09/211,808 entitled "METHOD, SYSTEM AND COMPUTER PROGRAM PRODUCT FOR SORTING TEXT STRINGS" and filed Dec. 15, 1998; Ser. No. 09/211,803 entitled "METHOD, SYSTEM AND COMPUTER PROGRAM PRODUCT FOR STORING TRANSLITERATION AND/OR PHONETIC SPELLING INFORMATION IN A TEXT STRING CLASS" and filed Dec. 15, 1998; Ser. No. 09/211,799 entitled "METHOD, SYSTEM AND COMPUTER PROGRAM PRODUCT FOR ROTATING THROUGH A SEQUENCE OF DISPLAY STATES IN A MULTI-FIELD TEXT CLASS IN A GRAPHICAL USER INTERFACE" and filed Dec. 15, 1998; Ser. No. 09/211,813 entitled "METHOD, SYSTEM AND COMPUTER PROGRAM PRODUCT FOR DISPLAYING THE CONTENTS OF ALL FIELDS IN A MULTI-FIELD TEXT STRING OBJECT" and filed Dec. 15, 1998; Ser. No. 09/211,801 entitled "METHOD, SYSTEM AND COMPUTER PROGRAM PRODUCT FOR DYNAMIC LANGUAGE SWITCHING IN A MULTI-FIELD TEXT STRING OBJECT VIA MESSAGING" and filed Dec. 15, 1998; and Ser. No. 09/211,812 entitled "METHOD, SYSTEM AND COMPUTER PROGRAM PRODUCT FOR AUTOMATIC CHARACTER TRANSLITERATION IN A TEXT STRING OBJECT" and filed Dec. 15, 1998. The content of the above-referenced applications is incorporated herein by reference.

BACKGROUND OF THE INVENTION

1. Technical Field

The present invention relates in general to text string display and entry controls in data processing systems and in particular to providing backwards compatibility for legacy controls to display the contents of a multi-field text string class without implementing specialized display controls. Still more particularly, the present invention relates to providing backwards compatibility for a legacy control to both display and change or enter contents of a multi-field text string class.

2. Description of the Related Art

Multinational companies often run information system (IS) networks which span multiple locales spread around the globe. To maximize the usefulness of such networks, operations within each country tend to run in the local language of the country. Where possible, names of abstract objects in user applications are in the local language and match the local language organization, city, or human names which the abstract objects represent. In the case of system management software, often abstract objects would represent each of a global enterprise's local offices.

Central management of such a global network may be difficult or impossible when abstract object names utilize the local language and the local language's underlying character set. For offices located in Egypt, abstract objects would most naturally be named in Arabic; offices in Russia would name objects utilizing the Cyrillic character set; and for offices in Japan, objects would be named in Japanese. A problem arises, however, when a enterprise's headquarters IS staff attempts to examine these objects. The IS staff at the multinational headquarters located in the United States is unlikely to be able to read Arabic or Japanese, or even recognize Cyrillic characters.

Japanese, for example, is a logosyllabic or ideographic language which does not have an alphabet representing simple sounds, but instead has a very large character set with symbols ("ideographs") corresponding to concepts and objects rather than simple sounds. For instance, the Joyo Kanji List (Kanji for Daily Use) adopted for the Japanese language in 1981 includes 1945 symbols. Users unfamiliar with the Kanji characters will have difficulty identifying a particular abstract object named in Japanese, as well as difficulty even discussing such abstract objects over the telephone with an English- and Japanese-speaking counterpart.

Additionally, merely seeing an ideograph may provide no clue as to the correct meaning or pronunciation since, in Japanese, the same character may have multiple meanings or pronunciations. For instance, the character depicted in FIG. 4A may mean either "West" or "Spain"; the symbol depicted in FIG. 4B may be pronounced either "hayashi" or "rin" (or "lin"); and the characters depicted in FIG. 4C may be pronounced "suga no," "suga ya," "kan no," or "kan ya." This circumstance is based in part on the history of the Japanese language, in which the Kanji characters were adopted from the Chinese language. Thus, for example, the "rin" symbol depicted in FIG. 4B is On-Yomi, basically a simulation of the Chinese pronunciation when the character was imported to Japan, while "hayashi" is Kun-Yomi, a Japanese word assigned to the character which has the same meaning.

A multi-field text string class disclosed in the related applications may be employed to encapsulate identification, meaning, and pronunciation information for a text string within a single object. However, displaying the contents of such a multi-field text string class object would normally require implementation of specialized controls. Furthermore, even if legacy controls could display the contents of a multi-field text string class object, such legacy controls do not necessarily include an inherent mechanism for influencing groups of controls as a monolithic unit.

It would be desirable, therefore, to provide a mechanism for displaying the contents a multi-field text string class object without implementing specialized controls. It would further be advantageous for the mechanism to perform the processing required to change the contents of a multi-field text string class object in response to change requests from legacy controls, and also provided a means for influencing the behavior of multiple controls as a monolithic unit.

SUMMARY OF THE INVENTION

It is therefore one object of the present invention to provide an improved method and apparatus for text display and entry controls in data processing systems.

It is another object of the present invention to provide a method and apparatus for supporting backwards compatibility for legacy controls to display the contents of a multi-field text string class without implementing specialized display controls.

It is yet another object of the present invention to provide a method and apparatus for supporting backwards compatibility for a legacy control to both display and change or enter contents of a multi-field text string class.

The foregoing objects are achieved as is now described. An interface to a multi-field text string object is provided to intercept display requests from a legacy control to the multi-field text string object. The interface passes contents of a current display field within the multi-field text string object to the legacy control in response to intercepted requests. The interface also intercepts change requests, such as Java setText( ) methods, from the legacy control to change the contents of the multi-field text string object. The intercepted change requests are redirected by the interface to a specialized change control, which implements methods for changing the contents of any field within the multi-field text string object. The specialized change control performs the change requested by the legacy display control on a current display field of the multi-field text string objects. The interface thus precludes the necessity of implementing specialized display control merely for displaying the contents of the multi-field text string object, permitting legacy controls to display the contents of a current display field. The interface may also be coupled to a grouping class allowing multiple controls—either specialized or legacy controls—to be influenced as one monolithic unit.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figures 1, 4A, 4B, 4C:
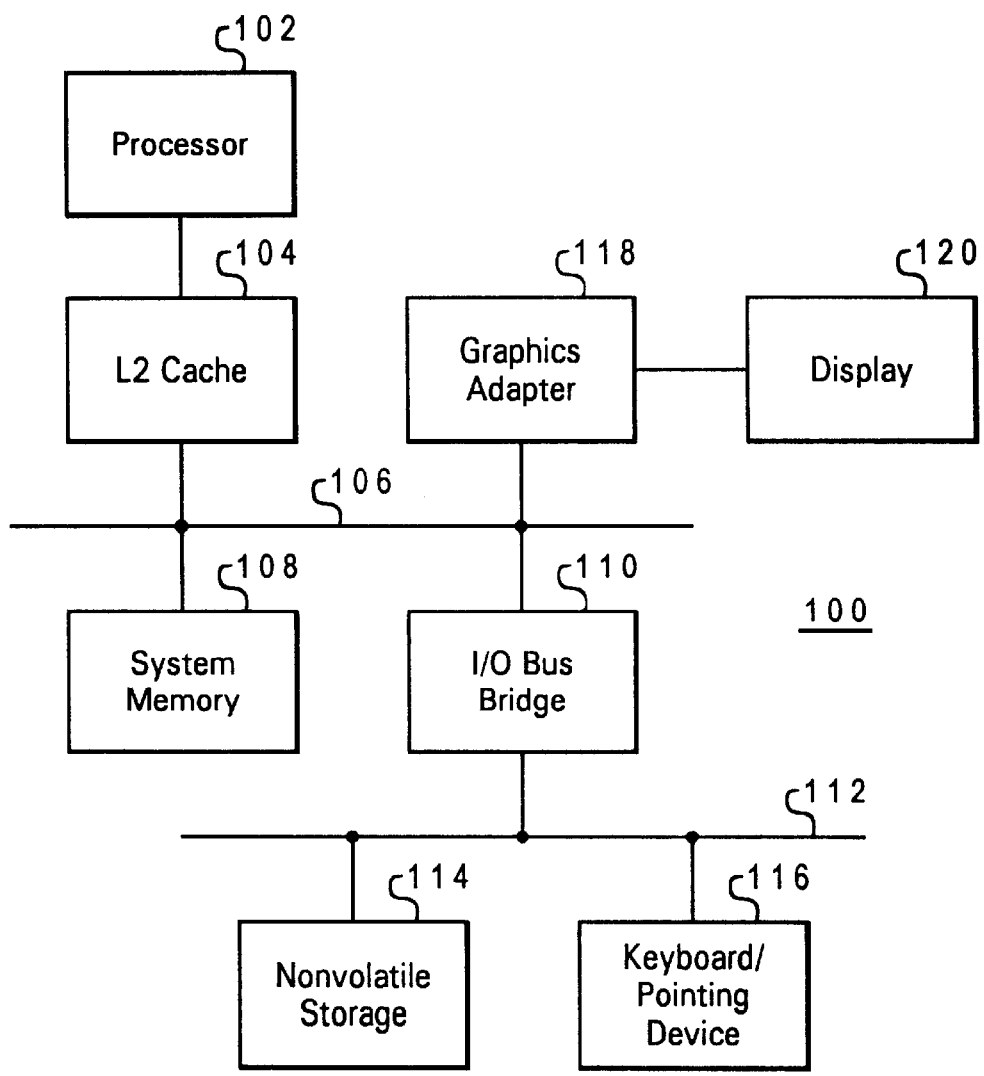
FIG. 1 depicts a diagram of a data processing system in which a preferred embodiment of the present invention may be implemented.
FIGS. 4A–4C depict ideographs having multiple meanings or pronunciations.

With reference now to the figures, and in particular with reference to FIG. 1, a block diagram of a data processing system in which a preferred embodiment of the present invention may be implemented is depicted. Data processing system 100 may be, for example, one of the Aptiva® available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile disk (DVD) drive, a sound card and audio speakers, and numerous other optional components. All such variations are believed to be within the spirit and scope of the present invention. Data processing system 100 and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2:
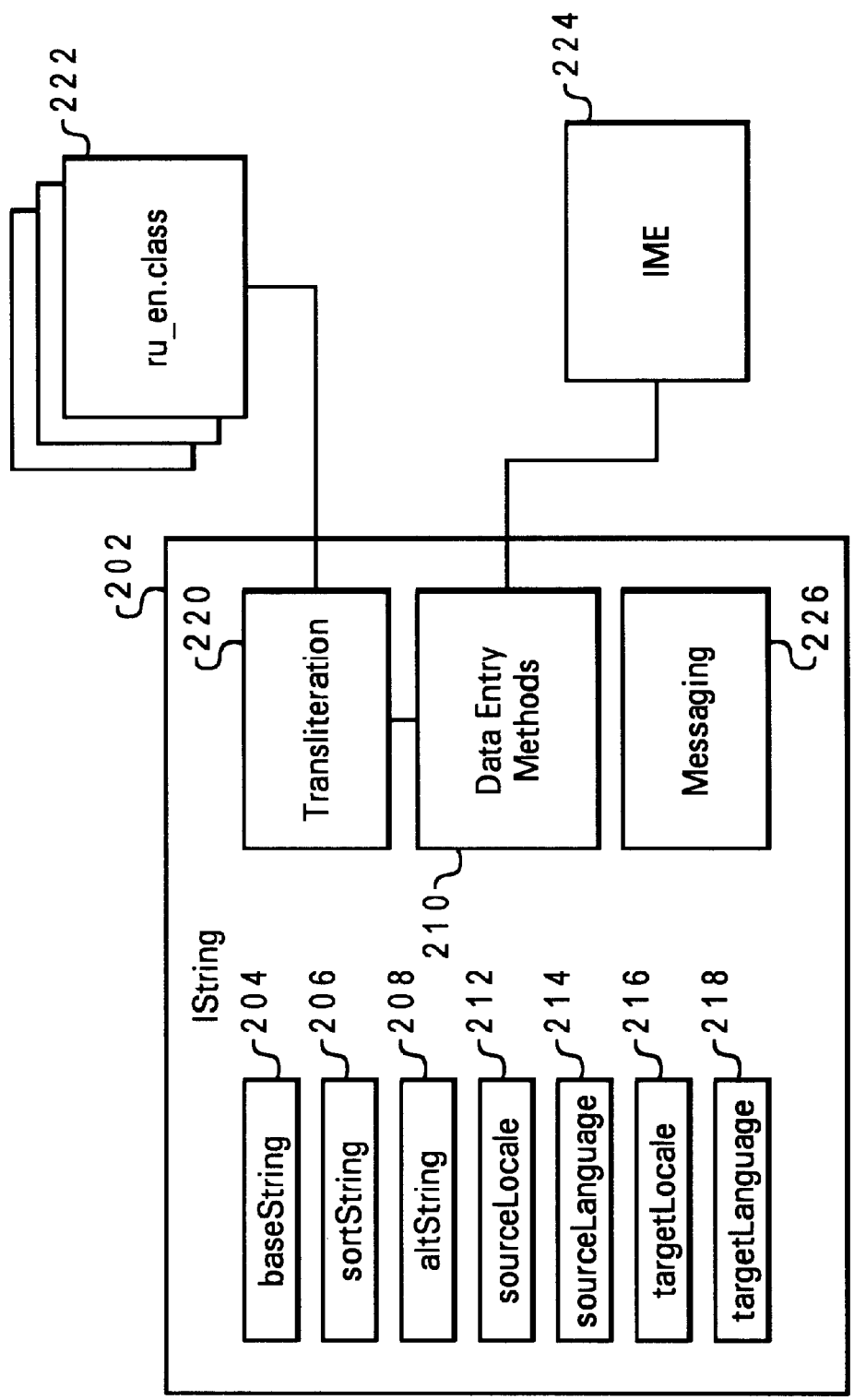
FIG. 2 is a diagram of a multi-field text string class for which a controller may be implemented to enable display by single-field text controls in accordance with a preferred embodiment of the present invention.

Referring to FIG. 2, a diagram of a multi-field text string class for which a controller may be implemented to enable display by single-field text controls in accordance with a preferred embodiment of the present invention is depicted. A fundamental problem in multinational computing environments which need to display data in multiple human languages is that a spoken word generally encapsulates information in multiple aspects or attributes, such as through the word's meaning, from context, and/or from inflection. When reduced to a visual or electronic representation for manipulation or display in a data processing system, the word may lose some attributes and much of the associated meaning. Most importantly for data processing systems, a visual representation of a word may give no clues as to the correct translation or pronunciation of the word or the proper placement of a word within a specified sort order. International String ("IString") class 202 may be employed to address this problem.

IString class 202 is preferably a Java class similar to the Java String class, which behaves like the String class by including similar methods. Most of the original behavior of the String class should be preserved, with additional functionality added and utilized only as needed. IString class 202 is a datatype which captures some of the meaning of spoken words which is normally lost when the word is reduced to a visual representation. IString class 202 is preferably utilized for all object names and system messages within a system.

The IString class 202 structure includes three different strings for each name, message, data, or text object: a baseString 204, a sortstring 206, and an altString 208. BaseString 204 is the string within IString class 202 employed by default in the user interface display and may contain any text, usually the original text entered by the user in the local language where the IString object is created. SortString 206 may also be any text and is employed to allow correct sorting of non-phonetic languages and languages which are difficult to sort based only on the binary value of baseString 204. AltString 208 may be any text but should conventionally be filled with a latin character set representation of the pronunciation of the data contained in baseString 204. Thus, IString class 202 includes the original text (baseString 204), a sort key (sortString 206), and a pronunciation key (altString 208) for object names, system messages, and other data.

When implemented in Java, a constructor for an IString class 202 object may be composed of the following fields:

/** The base text String */ protected String baseString;

/** The related text String for proper collation */ protected String sortString;

/** The related alternate text String (pronunciation key) */ protected String altString;

/** The source locale, as an ISO-3166 code; used for collation */ protected String sourceLocale;

/** The source language, as an ISO-639 code */ protected String sourceLanguage;

/** The source variant defined for EBCIDIC and case mapping */ protected String sourceVariant;

/** The target locale, as an ISO-3166 code */ protected String targetLocale;

/** The target language, as an ISO-639 code */ protected String targetLanguage;

/** The target variant defined for EBCIDIC and case mapping */ protected String targetVariant;

Complete listings of the upper-case, two letter ISO Country Codes defined by ISO-3166 and the lower-case, two letter ISO Language Codes defined by ISO-639 are readily available from a variety of sources on the Internet.

Table I illustrates how data within the IString data type 202 looks when represented as a table:

TABLE I

| Field | Type | Data |
| --- | --- | --- |
| baseString | Java String | The user's text |
| sortString | Java String | Language/locale dependent |
| altString | Java String | Language/locale dependent |
| sourceLocale | Java String | ISO-3166 code, example "US" |
| sourceLanguage | Java String | ISO-639 code, example "en" |
| sourceVariant | Java String | Variant code |
| targetLocale | Java String | ISO-3166 code, example "JP" |
| targetLanguage | Java String | ISO-639 code, example "ja" |
| targetVariant | Java String | Variant code |

A Java constructor for a new, empty IString class object 202 where the contents are independent of language or locale may be:

```
/* * * * * * * * * * * * * * * * * * * * * * * * * * * * * * *
*
* <P> </P>
*
* <dt> <b>Description:</b> <dd>
* <p> Allocate a new IString containing no characters in the default
* locale.</p>
*
* * * * * * * * * * * * * * * * * * * * * * * * * * * * * * * *
public IString( ) {
    this.baseString = new String( );
    this.sortString = new String( );
    this.altString = new String( );
    init( );
}
```

To allow objects of the IString class 202 datatype to be stored in an Object Database (ODB), however, and to permit manipulation of IString data by Common Object Request Broker Architecture (CORBA) applications, an Interface Definition Language (IDL) class should be defined:

```
struct IString{
    string baseString;        //base test String
    string sortString;        //related text String for collation
    string altString;         //related alternate text String (pronunciation)
    string sourceLocale;      //source locale as an ISO-3166 code
    string sourceLanguage;    //source language as an ISO-639 code
    string sourceVariant;     //source variant code
    string targetLocale;      //target locale as an ISO-3166 code
    string targetLanguage;    //target language as an ISO-639 code
    string targetVariant;     //target variant code
}
```

The contents of baseString 204, sortstring 206, and altString 208 are preferably but not necessarily Unicode text entered by data entry methods 210 within IString class 202. Data entry methods 210, and thus the contents of baseString 204, sortString 206, and altString 208, may depend at least in part on language and locale parameters defined by sourceLocale field 212, sourceLanguage field 214, targetLocale field 216, and targetLanguage 218.

Because data entry methods 210 are dependent on the locale and/or langauge employed by the underlying host system, creation of a new IString object 202 preferably results in the locale and language properties of the host system in which the IString object 202 is created being placed in sourceLocale field 212 and sourceLanguage field 214. A constructor for allocating a new, empty IString for a specified locale and language determined from the host system in which the IString class object 202 is being created may be:

```
/* * * * * * * * * * * * * * * * * * * * * * * * * * * * * * *
*
* <P> </P>
*
* <dt> <b>Description:</b> <dd>
* <p> Allocate a new IString containing no characters in the
* specified locale.</p>
*
* * * * * * * * * * * * * * * * * * * * * * * * * * * * * * * *
public IString(Locale loc) {
    this.baseString = new String( );
    this.sortString = new String( );
    this.altString = new String( );
    this.sourceLocale = loc.getLocale( );
    this.sourceLanguage = loc.getLanguage( );
    init( );
}
```

Input of data into an IString class 202 object is preferably locale- or language-dependent. The sourceLanguage and targetLanguage properties 214 and 218 control how data is input into an IString class object 202 by data input methods 210. The sourceLanguage property 214 may be set to the language property of the host system on which the IString class object is created. The targetLanguage property 218 may also be set to that language, or may alternatively be set to a common, "universal" language such as English. Data input methods 210 compare sourceLanguage and targetLanguage properties 214 and 218 to determine what is entered into baseString 204, sortString 206, and altString 208 in an IString class object 202.

Character strings are entered into the baseString 204, sortString 206, and altString 208 fields by data input methods 220 for IString class 202, which may selectively utilize data from either the user's direct entry or specification, from transliteration engine 220, or from the Input Method Editor (IME) 224. Where the targetLanguage property 218 is set to English as a default, data entry methods 210 determine the contents of baseString 204, sortString 206, and altString 208 fields based upon the character set employed by the language in which data is entered by the user (sourceLanguage property 214).

For languages which employ the latin character set, the user input is placed by data entry methods 220 into all three fields (baseString 204, sortString 206, and altString 208) of the IString class 202 by data entry methods 210. A suitable constructor may be:

```
/* * * * * * * * * * * * * * * * * * * * * * * * * * * * * * *
 *
 * <P> </P>
 *
 * <dt> <b>Description:</b> <dd>
 * <p> Allocate a new IString which contains the same sequence of
 * characters as the string argument in the specified locale.</p>
 *
 * * * * * * * * * * * * * * * * * * * * * * * * * * * * * * *
    public IString(String str, Locale loc) {
        this.baseString = new String(str);
        this.sortString = new String(str);
        this.altString = new String(str);
        this.sourceLocale = loc.getLocale( );
        this.sourceLanguage = loc.getLanguage( );
        init( );
    }
```

For most locales and languages, the entered string will be input into all three fields of the IString object 202. If targetLanguage property 218 were not set to English, data entry methods 224 would input the user-entered text into all three fields whenever the languages identified in sourceLanguage and targetLanguage properties 214 and 218 employ a common character set (e.g., both employ latin characters, as in the case of Spanish and Afrikaans).

Table II illustrates how data is entered into IString class 202 fields where the host language and locale utilize the latin character set.

TABLE II

| Field | Type | Data |
|---|---|---|
| baseString | Java String | Hetherington |
| sortString | Java String | Hetherington |
| altString | Java String | Hetherington |
| sourceLocale | Java String | US |
| sourceLanguage | Java String | en |
| targetLocale | Java String | US |
| targetLanguage | Java String | en |

If desired, the fields may be individually edited and the object artificially promoted for sorting purposes by inserting a string having a lower sort value (e.g., "AAA_ Hetherington") into sortString 206.

For languages which do not employ the latin character set, but which utilize a character set which may be sound mapped to the latin character set, the user input is entered by data entry methods 210 into baseString 204 and sortString 206, but a transliterated, phonetic representation of the input is placed in altString 208. An internal method within the transliteration engine 220 is employed to sound-map the passed string to a phonetic, latin character representation for altString 208 to transliterate entered characters into other characters understandable to people who are not familiar with the character set of the original language.

To generate the contents of altString 208, transliteration engine 220 selects an appropriate Java resource file 222 containing a mapping table to create the alternate text to be placed in altString 208. The selection of the particular resource file which is employed based on the combination of source and target languages. Java resource files 222 are named for the combination of languages for which the mapping is being performed. In the example shown in FIG. 2, ru_en.class is for mapping Russian (Cyrillic characters) to English (Latin characters). The structure of resource file 222 is a table with associated entries for foreign language characters and corresponding latin characters.

A suitable constructor for an IString object in which altString 208 is transliterated from the passed string may be:

```
/* * * * * * * * * * * * * * * * * * * * * * * * * * * * * * *
 *
 * <P> </P>
 *
 * <dt> <b>Description:</b> <dd>
 * <p> Allocate a new IString. The baseString and sortString are the
 * passed string, the altString is transliterated into the target
 * language.</p>
 *
 * * * * * * * * * * * * * * * * * * * * * * * * * * * * * * *
    public IString(String str) {
        this.baseString = new String(str);
        this.sortString = new String(str);
        if(isSameLanguage(( )
            this.altString = new String(str);
        else
            this.altString = transmogrify(str,
                                          this.sourceLanguage,
                                          this.targetLanguage);
    }
```

The "transmogrify" method is the internal method within transliteration engine 220 which was described above. The character set into which the entered characters are transliterated is determined from the targetLanguage property 218, which in the exemplary embodiment is assumed to be set to English. Given an appropriate resource file 222, however, characters may be transliterated between any two languages for which characters in one language sound-map to one or more characters in the other.

Table III illustrates how data is entered into IString class 202 by data entry methods 210 where the language utilizes a non-latin character set which maps to the latin character set, such as Russian Cyrillic.

TABLE III

| Field | Type | Data |
|---|---|---|
| baseString | Java String | Давид Кумгир |
| sortString | Java String | Давид Кумгир |
| altString | Java String | David Kumhyr |
| sourceLocale | Java String | RU |
| sourceLanguage | Java String | ru |
| targetLocale | Java String | US |
| targetLanguage | Java String | en |

In the example shown, the text entered by the user is inserted into both baseString 204 and sortString 206, but the text entered into altString 208 is selected by transliteration engine 220 utilizing a resource table of Russian Cyrillic to English character sound mappings. The phonetic representation of the baseString 204 is thus entered into altString 208 as a pronunciation key for users unfamiliar with the Cyrillic character set.

For languages which do not employ the latin character set or a character set which may be sound-mapped to the latin character set, data entry methods 210 input data into the baseString 204, sortString 206, and altString 208 fields which is derived from the input method editor (IME) 224. IME 224 may be either a customized input method editor or the input method editor which is integrated into Asian versions of the Windows NT operating system available from Microsoft Corporation of Redmond Wash. If the Windows NT input method editor is employed, the appropriate data must be extracted from the Windows NT input method editor internal data storage.

Table IV illustrates how data is entered into IString class 202 by data entry methods 210 for logosyllabic languages, such as Japanese, which employ neither the latin character set nor a character set which may be sound-mapped to the latin character set.

TABLE IV

| Field | Type | Data |
|---|---|---|
| baseString | Java String | <Kanji> |
| sortString | Java String | はやし |
| altString | Java String | hayashi |
| sourceLocale | Java String | JP |
| sourceLanguage | Java String | ja |
| targetLocale | Java String | US |
| targetLanguage | Java String | en |

Logosyllabic languages do not have alphabets, but instead have very large character sets with symbols ("ideographs") corresponding to concepts and objects rather than simple sounds. For instance, the Joyo Kanji List (Kanji for Daily Use) adopted for the Japanese language in 1981 includes 1945 symbols. Normal computer keyboards cannot contain enough separate keys to have one for each symbol in the language, so input is accomplished phonetically utilizing keystroke combinations to select characters from one of two phonetic syllabaries, hiragana or katakana, and dictionary lookup for Kanji symbol creation. The process is implemented in the Windows NT input method editor identified above.

For logosyllabic or ideograhic languages, therefore, the data entered into altString 208 is the latin characters typed by the user to compose the desired ideograph. The data entered into sortString 206 are the syllabary characters phonetically spelling the desired ideograph, providing an intermediate representation of the ideograph. The data entered into baseString 204 is the final ideograph selected by the user. As with transliteration of non-latin characters as described above, non-latin characters may be entered into altString 208 if the targetLanguage property is set to a language other than English and IME 224 supports composition of the ideographs by phonetic spelling in a language other than English. For instance, an IString object 202 might contain Japanese Kanji in baseString 204, hiragana in sortString 206, and Cyrillic characters in altString 208 if IME 224 permits composition of Japanese Kanji characters by phonetic spelling in Russian.

A suitable constructor for receiving baseString 204, sortString 206 and altString 208 from IME 224 via data entry methods 210 for entry into an IString object 202 may be:

```
/***************************************************
 *
 *   <P></P>
 *
 *   <dt><b>Description:</b><dd>
 *   <p> Allocate a new IString. The baseString, sortString and
 *   altString are entered from the IME utilizing the default language and
 *   locale.</p>
 *
 ***************************************************/
public IString(String base,
               String sort,
               String alt,
               Locale src,
               Locale tgt) {
    this.baseString = base;
    this.sortString = sort;
    this.altString = alt;
    this.sourceLocale = src.getLocale( );
    this.sourceLanguage = src.getLanguage( );
    this.targetLocale = tgt.getLocale( );
    this.targetLanguage = tgt.getLanguage( );
    init( );
}
```

The contents of baseString 204, sortString 206 and altString 208 are entered into the respective fields from data derived from IME 224, while the contents of sourceLocale 212 and sourceLanguage 214 are entered from the default locale and language properties specified by the host system in which data is being entered into IString object 202. The contents of targetLocale 216 and targetLanguage 218 will typically be a locale/language code for a language utilizing the latin character set such as "en_US" (English—United States).

Regardless of the language in which text is entered into an IString class object 202, the data automatically entered into each of the baseString 204, altString 206, and sortString 208 by data entry methods 210 may be overridden or altered using other methods. The fields of an IString object 202 may preferably be individually and independently edited, allowing artificial promotion within sortString field 206 as described above, replacement of an erroneously selected ideograph in baseString field 204, or correction of a phonetic spelling within altString field 208.

While the above-described methods assumed that the source and target languages were taken from host system defaults, data may alternatively be entered into baseString 204, sortString 206 and altString 208 for specified source and target languages utilizing the constructor:

```
/***************************************************
 *
 *   <P></P>
 *
 *   <dt><b>Description:</b><dd>
 *   <p> Allocate a new IString. The baseString, sortString and
 *   altString are entered from the IME for specified target and source
 *   language and locale.</p>
 *
 ***************************************************/
public IString(String base,
               String sort,
               String alt,
               String srcLanguage,
               String srcLocale,
               String tgtLanguage,
               String tgtLocale) {
    this.baseString = base;
    this.sortString = sort;
```

-continued

```
        this.altString = alt;
        this.sourceLocale = srcLocale;
        this.sourceLanguage = srcLanguage;
        this.targetLocale = tgtLocale;
        this.targetLanguage = tgtLanguage;
        init( );
        }
```

In this constructor, the source and target language and locale which are employed to select the characters entered into baseString 204, sortString 206 and altString 208 may be specified. This latter constructor may be employed to create an IString object 202 in other than the host system default language, or in host systems where data for the IString object 202 is received from another system and a local instance is created.

It should be noted that transliteration engine 220 and messaging methods 226 need not necessarily be implemented within an IString class 202 as depicted in FIG. 2, and that IME method 224 need not be implemented separately. Transliteration engine 220 and messaging methods 226 may instead be implemented within separate subclasses which are appropriately constructed and/or invoked by IString class 202 as necessary, while IME 224 may be implemented as a method within IString class 202.

Transliteration engine 220 and IME 224 and are only required by data entry methods 210 to gather input data for IString class 202 objects under certain locale and language property settings. Otherwise, data may be programmatically input into baseString 204, sortString 206, and altString 208 by invoking the proper constructor. The methods which may be invoked by programs at runtime to programmatically get and set fields within IString 202 include:

```
/************************************************************
 *
 *   <P></P>
 *
 *   <dt><b>Description:</b><dd>
 *   <p> Get the IString baseString.</p>
 *
 *   @returns str String containing the base string
 *
 ************************************************************/
public String getBaseString( ) {
        return this.baseString;
        }
```

This method returns the contents for baseString 204 for an IString object 202. Similar methods return the contents of sortString 206 and altString 208:

```
/************************************************************
 *
 *   <P></P>
 *
 *   <dt><b>Description:</b><dd>
 *   <p> Get the IString sortString.</p>
 *
 *   @returns str String containing the sort string
 *
 ************************************************************/
public String getSortString( ) {
        return this.sortString;
        }
```

-continued

```
/************************************************************
 *
 *   <P></P>
 *
 *   <dt><b>Description:</b><dd>
 *   <p> Get the IString altString.</p>
 *
 *   @returns str String containing the alt string
 *
 ************************************************************/
public String getAltString( ) {
        return this.altString;
        }
```

The methods also include setting baseString 204:

```
/************************************************************
 *
 *   <P></P>
 *
 *   <dt><b>Description:</b><dd>
 *   <p> Set the IString baseString.</p>
 *
 *   @param str String containing the base string
 *
 ************************************************************/
public void setBaseString(String sBase) {
        this.baseString = sBase;
        }
``` as well as sortString 206 and altString 208:

```
/************************************************************
 *
 *   <P></P>
 *
 *   <dt><b>Description:</b><dd>
 *   <p> Set the IString sortString.</p>
 *
 *   @param str String containing the sort string
 *
 ************************************************************/
public void setSortString(String sSrt) {
        this.sortString = sSrt;
        }
/************************************************************
 *
 *   <P></P>
 *
 *   <dt><b>Description:</b><dd>
 *   <p> Set the IString altString.</p>
 *
 *   @param str String containing the alt string
 *
 ************************************************************/
public void setAltString(String sAlt) {
        this.altString = sAlt;
        }
```

In addition to getting and setting baseString 204, sortString 206, and altString 208 for an IString object 202, programs may need to get or set the display locale or language of an IString object 202. Accordingly, other methods are provided to permit a program to get and/or set the locale or language properties of IString data:

```
/***************************************************
 *
 *   <P></P>
 *
 *   <dt><b>Description:</b><dd>
 *   <p> Get the locale of the IString data.</p>
 *
 *   @returns loc Locale containing the locale of the data
 *
 ***************************************************/
public Locale getLocale( ) {
    Locale loc = new Locale(this.sourceLanguage, this.sourceLocale);
    return loc;
}
/***************************************************
 *
 *   <P></P>
 *
 *   <dt><b>Description:</b><dd>
 *   <p> Set the locale of the IString data.</p>
 *
 *   @param loc Locale of the data
 *
 ***************************************************/
public void setLocale(Locale loc) {
    this.sourceLocale = loc.getLocale( );
    this.sourceLanguage = loc.getLanguage( );
}
```

```
/***************************************************
 *
 *   <P></P>
 *
 *   <dt><b>Description:</b><dd>
 *   <p> Get the display language of the IString data.</p>
 *
 *   @returns Display language of the data
 *
 ***************************************************/
public String getDisplayLanguage( ) {
    Locale loc = new Locale(this.sourceLanguage, this.sourceLocale);
    return loc.getDisplayLanguage( );
}
/***************************************************
 *
 *   <P></P>
 *
 *   <dt><b>Description:</b><dd>
 *   <p> Get the display locale of the IString data.</p>
 *
 *   @returns Display locale of the data
 *
 ***************************************************/
public String getDisplayLocale( ) {
    if(this.sourceLanguage = = null&&this.sourceLocale = = null)
        return null;
    else{
        Locale loc = new Locale(this.sourceLanguage, this.sourceLocale);
        return loc.getDisplayLocale( );
    }
}
```

While these methods are available, IString class 202 preferably exhibits a "black box" behavior such that the programmer/user need not know anything about the methods implemented for IString class 202. IString class 202 simply appears as a data type which encapsulates extra information about baseString 204 and also includes some methods for transforming characters from one character set to another. For special cases where the sortString field 206 or altString field 208 are to be exposed to the user in addition to or in lieu of baseString 204, either for editing or for display only, a separate set of controls may be provided.

In the present invention, IString class 202 is employed to effectively transfer human language data across systems employing incongruous languages. The contents of baseString 204 provide a native representation of the text in the default language of the system originating the IString object 202. However, for each system participating in the exchange of data with other systems running in different human languages, the targetLocale property 216 and targetLanguage 218 property of an IString object 202 are preferably set to a common value (e.g., targetLocale="US", targetLanguage="en"). The contents of altString 208 will thus contain a common, cross-language representation of the text string. In systems where the default language of a system receiving an object differs from the language of the contents of baseString 204, IString class object 202 may automatically switch to presenting the contents of altString 208 as the text string to be displayed or processed.

Figure 3:
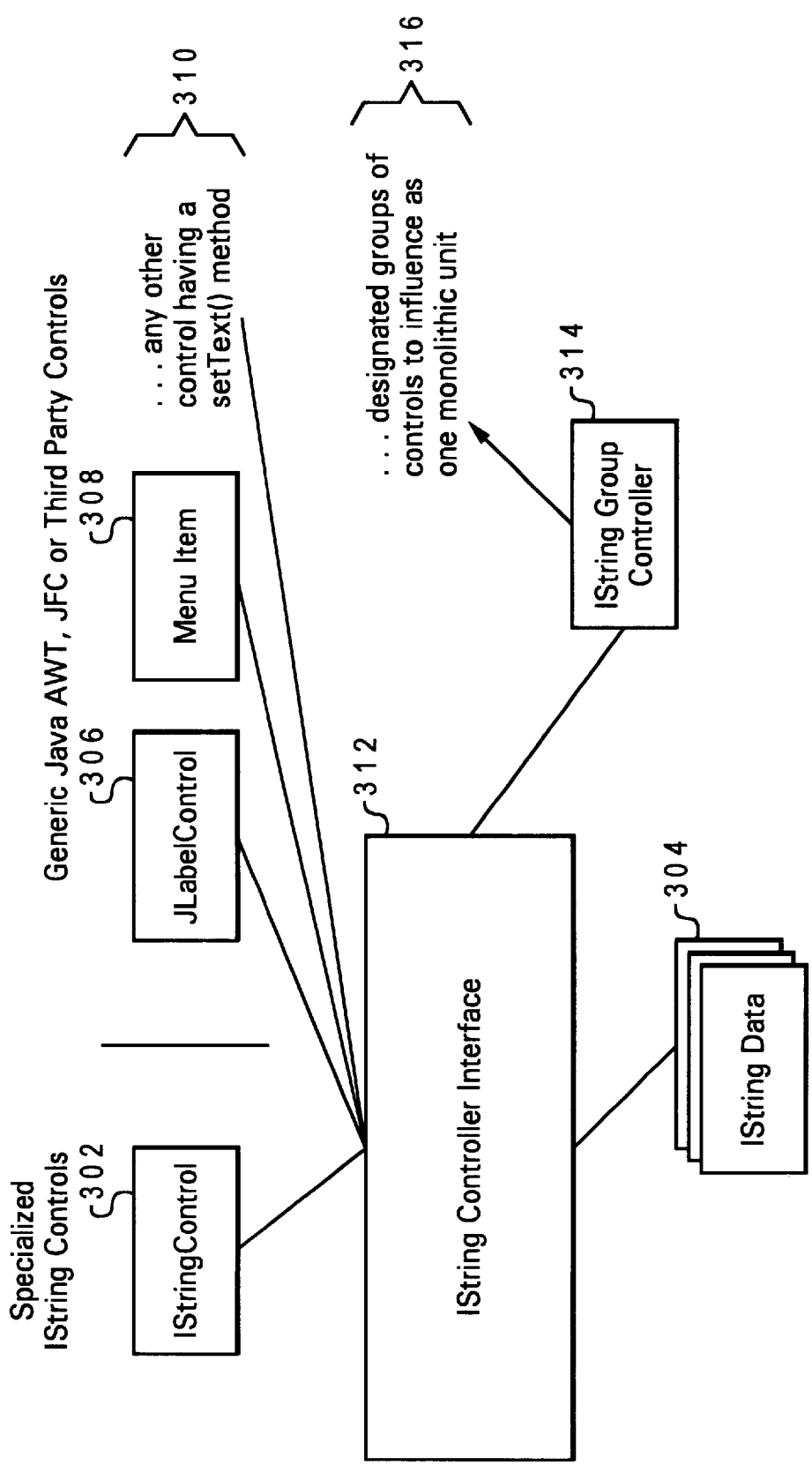
FIG. 3 depicts a diagram of a mechanism for providing control over the display and editing of individual multi-field text class objects or discrete sets of multi-field text class objects in accordance with a preferred embodiment of the present invention.

Referring to FIG. 3, a diagram of a mechanism for providing control over the display and editing of individual multi-field text class objects or discrete sets of multi-field text class objects in accordance with a preferred embodiment of the present invention is depicted. In order to enable all Java Abstract windowing Toolkit (AWT) controls to use and display IString information, a text manager class, IStringControl 302, and an IString controller interface 312 are defined. IString controller interface 312 intercepts all display requests to IString objects 304, passing the contents of a current display field to a control in response to such display requests. IString controller interface 312 thus allows legacy controls to display the contents of IString objects 304 without a specialized display control.

The constructor for IStringControl 302 takes as its parameters an IString class 304 instance and a Java Foundation Class (JFC) control 306, a menu item 308, or any other control 310 having a setText( ) method. IStringControl constructor 302 is responsible for managing which IString field (baseString, sortString, or altString) is visible in the control which it manages, and for implementing methods to enter or change text within the IString objects 304. IStringControl 302 intervenes in all calls to the setText( ) method of any control, performing the necessary processing to enter text in a field of an IString object 304 utilizing a control.

For each instance of a text control within a user interface dialog, instead of calling the setText( ) method on the JFC control, an IString controller interface 312 and the JFC control are created along with an IStringControl 302 to manage the JFC control. This allows a dialog or frame containing a number of single-valued, text-based controls (e.g., JLabel or JTextField) to show IString values. Additionally, instead of taking a JFC control as one of its constructor parameters, IStringControl 302 could take a java.awt.Component instead and look for a setText( ) method employing introspection, making IString support potentially ubiquitous.

The IString controller ("IStringControlActions") interface 312 is also defined with methods for configuring and querying IStringControl 302. Such methods include:

public void setText( IString text ), public IString getText( ), public void setVisibleField( int field ), public int getVisibleField( ), setPopupEnabled( boolean enabled ), and isPopupEnabled( ).

The getText( ) and getVisibleField( ) methods are not voided within controller interface 312 to allow controller interface 312 to pass the contents of the current display field ("visibleField") to a legacy control, including Java AWT controls such as JLabel Control 306, JFC controls such as Menu Item 308, or any other control 310 including a getText( ) method.

The setText( ) and setVisibleField( ) methods within controller interface 312 are voided since a specialized IString control 302 should intervene in any calls to a setText( ) method within a legacy control. The parameter "field" in the methods listed above is either IStringControl.BASE, IStringControl.SORT, or IStringControl.ALT. The last two methods listed above determine whether popup displays are shown with IString field contents.

Additionally, a grouping class 314, analogous to Button-Group and called IStringControlGroup in the example, may be defined which implements the IStringControlOptions method. Instances 316 of IStringControl 302 may be added to grouping class 314 to create a context, such as a dialog or an entire application, within which all controls are configurable at once. With the structure shown in FIG. 3 and described above, the application and even the programmer have very little extra work to perform in order to utilize IString data within an application, although a richer set of methods for special operations may be utilized if desired.

Controller interface 312 also provides a mechanism for changing the display of IString data via messaging. IString data objects 304, controls 302, 306, 308, and 310, and group controller 314 all may register as listeners with controller interface 312 for messages which contain the language and/or locale code, such as a language change message, a locale change message, or a display change message. Language and locale change messages may alter the language and locale property settings within the underlying system, while a display change message may simply alter the language and/or locale (separately or jointly) employed to select IString data display fields without altering the underlying system language and locale properties.

The language, locale, and display change message(s) may be initiated either by a user through a dialog to controller interface 312 or by an application sending an appropriate message. When a new language and/or locale is selected, all enabled subscribers may choose to react to the message by reloading human language and reformatting locale specific data. The language, locale, and display change messages may invoke one or more messaging methods 226 within an IString object 202 depicted in FIG. 2.

When a language change message is received, IString objects 302 operate on their data logically. Some IString objects 302 may have no behavior change for a change of language, but do for a change of locale. For example, a numeric date display would change its presentation format depending on the locale selected (e.g., from U.S. to European), but the digits would not change. Other objects will have behavior changes for both language and locale, as in a text date display which changes both the presentation format and the textual month name and weekday name.

Message based display changes enable run time switching of the display language and behavior of any application which implements a listener (not just IString-based applications) to suit the user's language needs and cultural preferences. Users may thus change language as needed independently of both operating system and locale, with objects responding logically. For instance, a user may elect to view IString data displayed in Italian even though operating on a system installed as US English and running in a US locale. The user will then view IString data in Italian language and data formatting. A user may select a different language in mid-transaction to view a display in a language with which the user is more comfortable.

Message-based display changes also permit remote support. A user on one data processing system operating, for instance, in New York may receive user interface displays and controls transmitted from another data processing system operating in, say, Moscow. The display transmitted from Moscow to the troubleshooter's local system in New York may be switched by system messages to display the altString field for all IString objects, allowing the troubleshooter to recognize the object names displayed. A system message may be transmitted between the systems to "flip" the remote display, and accordingly the user interface display received at the remote system in New York. Alternatively, only the New York user interface display may be flipped by transmitting a system message to the application which receives and processes the user interface display from the Moscow system.

The message-based display change mechanism additionally allows a user's language preference to be saved and restored so that language automatically changes when the user or operator changes. Message-based changing also permits one application to "flip" the display of other applications to a language necessary for the applications to interact. For instance, an Internet commercial transaction may force a local accounting application to switch to a particular language and locale to complete a transaction, with the accounting application reverting back to the default language and locale (with appropriate conversion of dates, currencies, etc.) upon completion of the transaction.

The controller interface of the present invention permits both legacy controls to display the contents of a current display field within an IString class object without implementing specialized display controls. By intervening in setText( ) methods from legacy controls, the controller interface and IString control paired to the legacy control also permit the legacy control to edit the contents of a current display field within an IString object.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of controlling a display of a multi-field text string objects, comprising:
   providing an interface to the multi-field text string object from a legacy control utilizing single-field text strings;
   providing a connection in the interface to a grouping class for controls, wherein the grouping class implements option control methods concurrently configuring all member controls;
   intercepting display requests from the control to the multi-field text string object at the interface, wherein the display requests request a string field contents of the multi-field text string object by a message sent to a controller; and
   passing contents of a current display field for the multi-field text string object to the control utilizing the interface.

2. The method of claim 1, further comprising:
  providing a specialized control for managing which field is the current display field of the multi-field text string object and for editing contents of a selected field within the multi-field text string object;
  intercepting change requests from the control to the multi-field text string object at the interface, wherein the change requests request entry of a user-specified text string into the multi-field text string object; and
  redirecting intercepted change requests to the specialized control.

3. The method of claim 2, further comprising:
  entering the user-specific text string in the current display field of the multi-field text string object utilizing the specialized control.

4. The method of claim 2, wherein the step of intercepting change request form the legacy control to the multi-field text string object at the interface further comprises:
  intervening in calls to a setText( ) method within the legacy control.

5. The method of claim 1, wherein the step of providing an interface to the multi-field text string object from a legacy control further comprises:
  providing the interface to a single-valued text-based control.

6. The method of claim 5, wherein the step of providing an interface to the multi-field text string object from a legacy control further comprises:
  providing the interface to a JLabel or JTextField control.

7. A system for controlling a display of a multi-field text string objects, comprising:
  means for providing an interface to a multi-field text string object from a legacy control;
  means for providing a connection in the interface to a grouping class for controls, wherein the grouping class implements option control methods concurrently configuring all member controls;
  means for intercepting display requests from the legacy control to the multi-field text string object at the interface, wherein the display requests request the contents of the multi-field text string object for display; and
  means for passing contents of a current display field for the multi-field text string object to the legacy control utilizing the interface.

8. The system of claim 7, further comprising:
  means for providing a specialized control for managing which field is the current display field of the multi-field text string object and for changing a contents of a selected field within the multi-field text string object;
  means for intercepting change requests from the legacy control to the multi-field text string object at the interface, wherein the change requests request entry of a user-specified text string into the multi-field text string object; and
  means for redirecting intercepted change requests to the specialized control.

9. The system of claim 8, further comprising:
  means for entering the user-specific text string in the current display field of the multi-field text string object utilizing the specialized control.

10. The system of claim 8, wherein the means for intercepting change requests from the legacy control to the multi-field text string object at the interface further comprises:
  means for intervening in calls to a setText( ) method within the legacy control.

11. The system of claim 7, wherein the means for providing an interface to the multi-field text string object from a legacy control further comprises:
  means for providing the interface to a single-valued text-based control.

12. The system of claim 11, wherein the means for providing an interface to the multi-field text string object from a legacy control further comprises:
  means for providing the interface to a JLabel or JTextField control.

13. A computer program product within a computer usable medium for controlling a display of a multi-field text string objects, comprising:
  instructions for providing an interface to the multi-field text string object from a legacy control;
  instructions for providing a connection in the interface to a grouping class for controls, wherein the grouping class implements option control methods concurrently configuring all member controls;
  instructions for intercepting display requests from the legacy control to the multi-field text string object at the interface, wherein the display requests request the contents of the multi-field text string object for display; and
  instructions for passing contents of a current display field for the multi-field text string object to the legacy control utilizing the interface.

14. The computer program product of claim 13, further comprising:
  instructions for providing a specialized control for managing which field is the current display field of the multi-field text string object and for changing a contents of a selected field within the multi-field text string object;
  instructions for intercepting change requests from the legacy control to the multi-field text string object at the interface, wherein the change requests request entry of a user-specified text string into the multi-field text String object; and
  instructions for redirecting intercepted change requests to the specialized control.

15. The computer program product of claim 14, further comprising:
  instructions for entering the user-specific text string in the current display field of the multi-field text string object utilizing the specialized control.

16. The computer program product of claim 14, wherein the instructions for intercepting change requests from the legacy control to the multi-field text string object at the interface further comprises:
  instructions for intervening in calls to a setText( ) method within the legacy control.

17. The computer program product of claim 13, wherein the instructions for providing an interface to the multi-field text string object from a legacy control further comprises:
  instructions for providing the interface to a single-valued text-based control.

18. The computer program product of claim 17, wherein the instructions for providing an interface to the multi-field text string object from a legacy control further comprises:
  instructions for providing the interface to a JLabel or JTextField control.

* * * * *